United States Patent [19]

Tiger

[11] 4,273,271

[45] Jun. 16, 1981

[54] VOLUMETRIC DISPENSER

[76] Inventor: Howard L. Tiger, Eagle Ridge Way, West Orange, N.J. 07052

[21] Appl. No.: 40,725

[22] Filed: May 21, 1979

Related U.S. Application Data

[63] Continuation-in-part of Ser. No. 790,481, Apr. 25, 1977, abandoned.

[51] Int. Cl.³ .............................................. G01F 11/26
[52] U.S. Cl. .................................... 222/454; 222/442
[58] Field of Search ............... 222/442, 454, 455, 456, 222/457, 457.5; 239/428.5

[56] References Cited

U.S. PATENT DOCUMENTS

| 468,691 | 2/1892 | Proctor | 222/456 |
|---|---|---|---|
| 547,334 | 10/1895 | Cram | 222/456 |
| 1,297,244 | 3/1919 | Rauen | 222/455 |
| 1,438,892 | 12/1922 | Boykin | 222/442 |
| 2,111,007 | 3/1938 | Slobody | 222/442 |
| 2,791,352 | 5/1957 | Roper | 222/456 UX |
| 3,430,823 | 3/1969 | Hunsaker | 239/428.5 X |
| 3,841,534 | 10/1974 | Hirdes | 222/457 |

Primary Examiner—F. J. Bartuska
Attorney, Agent, or Firm—Charles E. Baxley

[57] ABSTRACT

The invention relates to a measuring dispenser adapted to be placed on a closed container of liquid, such as a bottle of medicine, in place of a screw cap or the like. The dispenser is of simplified construction, including an internal open-top dosage receptacle of variable effective capacity, capable of being filled by inverting the container and restoring it to its original position, and a passage connecting the interior of the dosage receptacle with an external delivery point. A separate, independent vent is provided, to eliminate the effects of pressure differences between the ambient atmosphere and the vapor space above the liquid in the container and the dosage receptacle.

1 Claim, 13 Drawing Figures

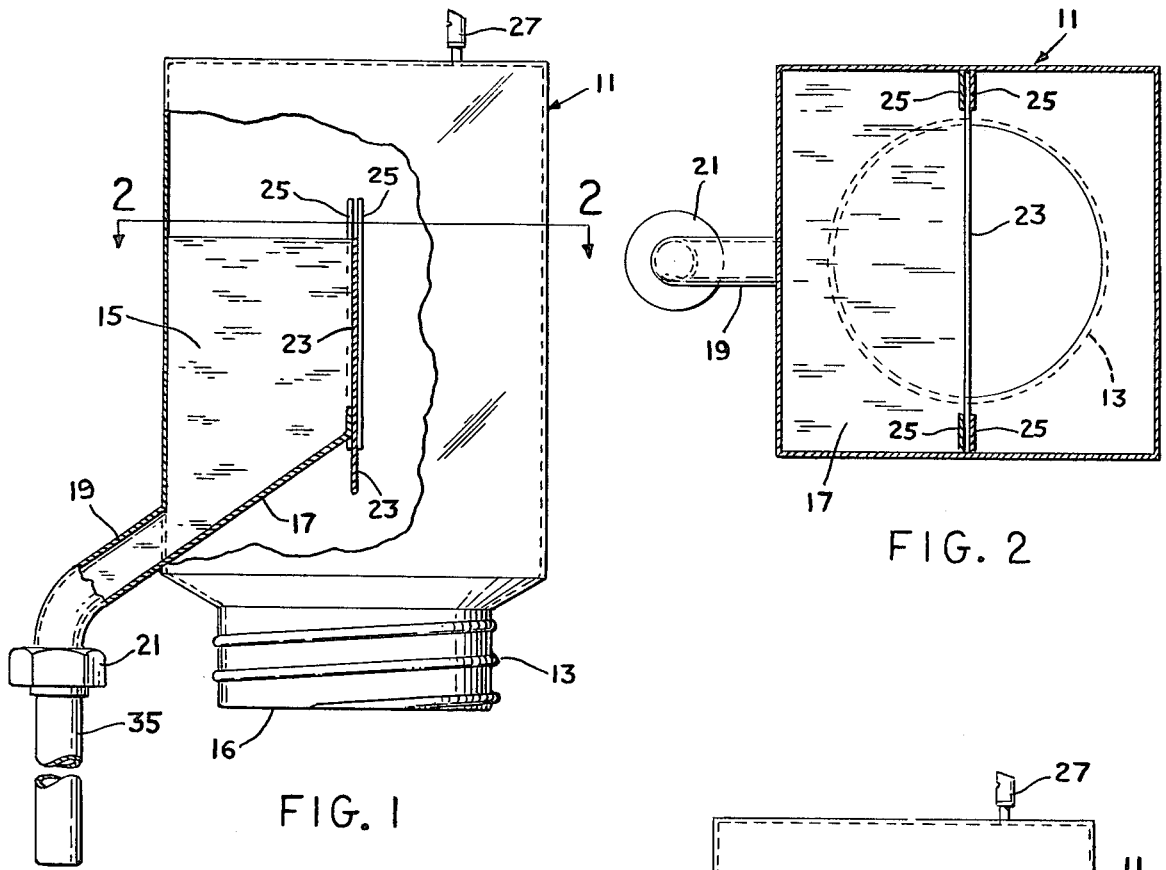
FIG. 1
FIG. 2
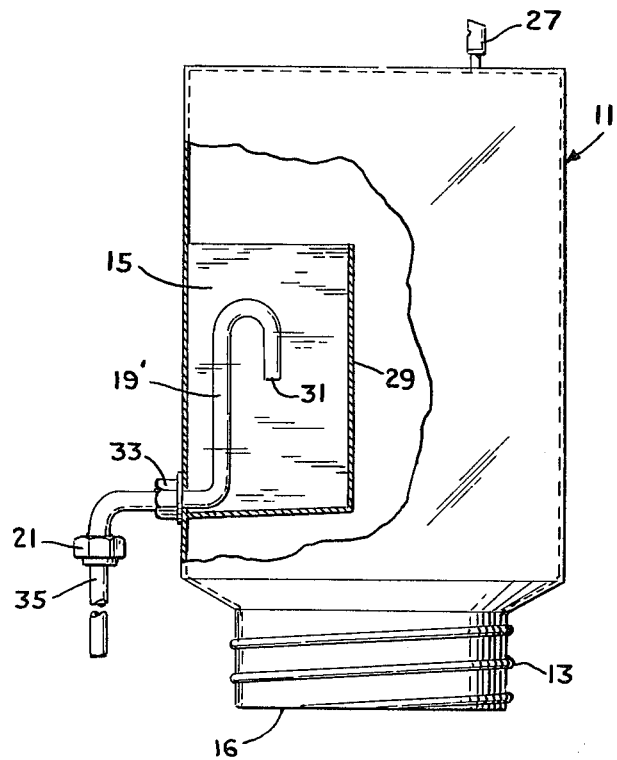
FIG. 3

VOLUMETRIC DISPENSER

CROSS REFERENCE

This is a continuation-in-part application with respect to copending U.S. patent application Ser. No. 790,481 filed Apr. 25, 1977 now abandoned.

BACKGROUND OF THE INVENTION

The art has long felt a need for a simple, inexpensive and automatic apparatus for dispensing the contents of a container of liquid in relatively small, accurately measured increments. This need exists, with varying requirements as to accuracy and service conditions, in such widely-varying applications as dispensing of liquid detergents, pouring of alcoholic beverages, dispensing of reagents in chemical laboratories and nutrients in bacteriology laboratories, etc.

One of the most important of such applications is in the dispensing of liquid medications, of both the ethical and the over the counter classifications. Although the dispensing of such medications does not in most cases require an analytical degree of accuracy and reproducibility, the usual approach—typically "one teaspoonful twice a day"—leaves much to be desired, considering that a teaspoonful, which is nominally equivalent to one dram, or 3.53 ml., or to 4 ml., depending on the conversion tables employed, may in fact be from 4 to 7.5 ml., more or less, depending on the design of the "teaspoon" (frequently more properly designated a dessert spoon) employed. In addition, an appreciable error is introduced in the measuring operation, depending on the skill of the person making the measurement. Thus one individual may fail to fill the spoon completely, to avoid spillage, whereas another may actually "pile up" the liquid beyond the rim of the spoon, to ensure "good measure." (Tablespoons vary even more widely—e.g. from 8 to 24 ml. depending on the particular spoon used, vs. a nominal value of $4 \times 3.53 = 14$ ml., approximately).

Moreover, the conditions of use may be such that the use of a spoon as a measuring device may be bypassed altogether, e.g. when the medication is to be mixed with water or other liquid, thus eliminating a possible source of inaccurate measurement and possible contamination introduced by possible spillage from a spoon or the like, or the possibility that such spoon or the like is contaminated.

Many devices have been proposed for the dispensing of controlled-volume increments of liquids from containers, but all, while partially successful, have suffered from one or more of a number of disadvantages. For example, many of the proposed expedients have been suitable for dispensing of only one predetermined quantity of liquid. Others have been prone to inaccuracies and erratic operation brought about by differences in pressure between the ambient atmosphere and the vapor space over the liquid inside the apparatus. Thus a partial vacuum inside the container, whether caused by fluctuations in ambient temperature and barometric pressure, or altitude differences between the point where the dispenser is first joined to the container and the point of use, or caused by repeated withdrawals of liquid without replacing the volume thus lost when an equivalent volume of air, tends to resist flow of liquid out of the dispenser, resulting in short dosage. By the same token an excess pressure in the apparatus tends to promote outflow of liquid, tending to overdosage. This difficulty does not arise when the container is opened to the atmosphere to pour out the measured dosage with each use, but this is attended by the danger of spillage and/or atmospheric contamination, as well as changes in potency when the formuation of the medication contains volatile components, such as alcohol, chloroform, ether, etc.

On the other hand, those which were not thus opened for each use generally depended upon providing for pressure equalization by allowing air to bubble into the reservoir of liquid medication simultaneously with the withdrawal of liquid therefrom. This led to the difficulties mentioned above, and also required that the dispenser construction be rather complicated, to allow measured dispensing of the liquid and simultaneous pressure equalization, without sacrificing either objective for the other. Some of these devices even made use of differential air pressure to control the flow of liquid and thereby cut off the flow at the desired volume. Such devices, although highly ingenious in many cases, generally required rather sophisticated, complicated, and consequently expensive mechanical construction.

While the foregoing description of the background of the invention has been touched primarily in terms of dispensing of medication, it will be recognized that the same considerations apply, with varying degrees of emphasis to a wide variety of other applications, as noted above.

Perhaps, one of the most important problems facing the packaging industry today are child safety features. These needed features compel the development of a liquid dispenser that will prevent a child from obtaining access to the contents of the container, while nevertheless enabling aged, infirm or arthritic adults to manipulate the container dispensing mechanism with sufficient ease to permit them to have access to the packaged medicines, materials, cleaning fluids or the like. For a number of years, articles have been published that describe the difficulty of developing a truly satisfactory "child-proof" medicine dispenser or bottle. In this respect the Jan. 9, 1970 issue of "The Kiplinger Newsletter," the May 11, 1978 issue of "The Wall Street Journal" (page 42) and the article entitled "Child-Proof Bottles vs. Five Year-Old- Kids" that was published in the August, 1978 edition of "Family Health" stress the unsolved problem of designing a bottle cap or closure that not only frustrates children's attempts to remove, but also does not make it too difficult for the aged or the weak to manipulate. The most popular commercial bottle caps of this nature all seem to require combinations of motions that often make cap removal very awkward for the elderly. The difficulty in reconciling these two apparently conflicting goals is underscored by the fact the U.S. Government Poison Prevention Packaging Act passed in 1970 seems to be largely unfulfilled in the marketplace for both liquid and solid containers. Thus, in addition to all of the foregoing needs, the further need to provide a liquid dispenser mechanism that does not involve coordination exercises or displays of brute strength to draw correct measures of contents from the bottle or package has heretofore remained unsatisfied.

OBJECTS OF THE INVENTION

An object of the invention, therefore, is to provide an improved volumetric dispenser.

Another object is to provide a volumetric dispenser characterized by improved accuracy and reproducibility with respect to the volume dispensed, as compared to commonly-used alternatives.

Still another object is to provide such a dispenser, which is capable of adjustment in a simple and convenient manner, to dispense a pre-selected volume of liquid on each usage.

A further object is to provide such a dispenser, which is provided with simple and inexpensive means for eliminating difficulties and inaccuracies resulting from pressure differences between the ambient atmosphere and the vapor space over the liquid in the container.

A still further object is to provide such a dispenser, which does not require that the container be opened for each usage, resulting in atmospheric contamination oxidation, and/or loss of volatile components from the contained liquid.

A particularly desirable object is to provide a dispenser in which the foregoing desiderata are supplied by the use of a simple, uncomplicated and inexpensive apparatus.

It is another object of the invention to provide a liquid dispenser that reconciles the need for a simple easily manipulated dispenser that nevertheless will frustrate the efforts of children to withdraw the contents therefrom.

Other objects, features and advantages will become apparent from the following more complete description and claims, together with the accompanying drawings.

BRIEF STATEMENT OF THE INVENTION

The above and other objects are achieved according to this invention which, in a particularly desirable embodiment contemplates a volumetric dispenser for dispensing measured increments of a liquid from a supply of the same, comprising in combination:
  a housing having a closed top and adapted to be connected in communcating relation with a closed container containing a supply of liquid,
  a dosage measuring receptacle disposed internally of said housing,
  said dosage measuring receptacle having a closed bottom and an open top disposed internally of said housing, and being fillable by inversion of said container and said housing followed by restoration thereof to their initial relative positions,
  means defining a passage extending from a point inside said dosage measuring receptacle to a delivery point outside said container,
  means for adjusting the effective volume of said dosage measuring receptacle to a selected value, and
  means independent of said dosage measuring receptacle and said means for adjusting the effective volume thereof, for relieving inequalities between the pressure of the ambient atmosphere and the pressure in the vapor space over the liquid in said container and in said dosage measuring receptacle.

Enhanced safety features are provided through the practice of the invention by means of an improved air inlet valve and key, or other suitable device, for opening and closing the valve to enable fluid to flow from the otherwise closed container.

A further development of this invention is the provision of a barrier within the container or other receptacle that obstructs a cap or other closure from being removed by engaging a pivoted or otherwise selectively movable bar or magnetically susceptible material. A small matching magnet, when placed adjacent to the bar, shifts the bar away from the barrier and enables the closure to be moved relative to the container. Thus, by requiring a separable, easily carried or concealed activating or unlatching magnet, to open the container a child would not be able to gain access to its contents. An aged or infirmed person however, would have no difficulty in removing the closure. For those containers that store liquids, a further adapter is provided for addition to the delivery tube which will prevent a child from sucking the contents from the container. Illustratively, the delivery tube discharges into a receiving cup that is secured to the end of the delivery tube. The receiving cup, however, is exposed to atmospheric pressure. In these circumstances, applying suction to the discharge outlet of the receiving cup cannot extract contents from the container.

The invention further provides for use in connection with snap-on type closures, a safety trough formed integrally with the body of the container that is spaced outwardly from the container surface a sufficient distance to accommodate an interposed closure lip. Thus, the safety trough blocks access to the edge of the closure, thereby preventing in ordinary circumstances the closure from being pryed upwardly and away from the container. A cam however, is provided on the protruding interposed lip of the closure and a lifting lever is pivoted to the surface of the container adjacent to the end of the protruding portion of the closure. By twisting the closure to align the cam with the lever, followed by pivotal movement of the lever, the combination presses the closure off the top of a container.

Here, as elsewhere throughout the present specification and claims, the terms "bottom," "top" and the like should be taken to mean the bottom, top, etc., of the named elements in their normal or shelf position, not their position when the assembly is inverted for the purpose of filling the dosage measuring receptacle.

BRIEF DESCRIPTION OF THE DRAWINGS

Referring now to the Figures, in which the same reference numerals retain the same significance throughout, FIG. 1 is an elevation, partially broken away to show internal details of a dispenser according to one embodiment of the invention.

FIG. 2 is a horizontal cross-section, taken along line 2—2 of FIG. 1, of the same embodiment as illustrated in FIG. 1.

FIG. 3 is an elevation, similar to FIG. 1, showing another embodiment of the invention.

DESCRIPTION OF PREFERRED EMBODIMENTS

Figure 4:
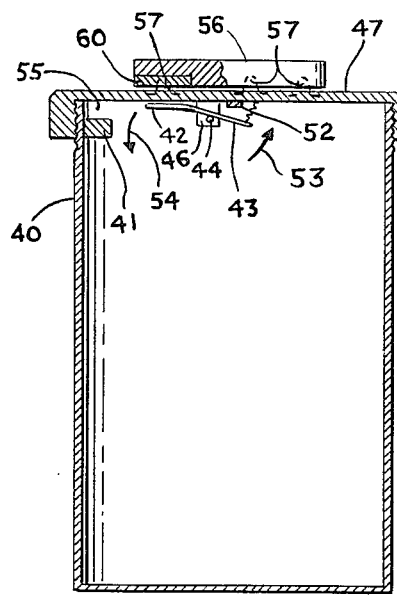
FIG. 4 is a front full vertical section of a magnetically activated container safety lock.

As shown in FIGS. 1 and 2, the invention comprises a housing, generally designated 11, having a closed top and a threaded bottom 13 adapted to screw onto the top of a container (not shown) such as a bottle of liquid medication in place of the cap of said bottle.

Obviously other forms of connection between the bottom of the housing and the top of the container may be employed as curcumstances may dictate—for example, a frictional insertion of the bottom of the housing into the top of a bottle in place of a cork or plastic stopper of the like.

Enclosed within housing 11 is a dosage measuring receptacle 15 having an open top communicating with the vapor space inside the housing 11, and closed at the bottom by a sloping floor 17. The floor 17 and/or the adjacent portion of the exterior wall of housing 11 are interrupted to provide an outlet passage communicating with a delivery tube 19, which may be connected, as at 21, with a suitable delivery means 35 such as a nipple, a flexible tube, etc.

The dosage measuring receptacle is defined by the floor 17, and in part by the wall of housing 11, as just described, and by an adjustable partition 23. Partition 23 is frictionally and fluid-tightly engaged between vertical guides 25, four in number, of which two are integral projections extending inwardly from one side of housing 11, and the other two are integral projections extending inwardly from the opposite wall thereof.

At the top, or at any other convenient location in the upper part, of housing 11, is a normally-closed, manually-openable air vent 27, of any conventional design, for example of the type used as a dispensing valve on aerosol containers.

In the embodiment of the invention illustrated in FIG. 3, the adjustable slide is omitted, and replaced by a solid wall 29. In this embodiment, there is provided a delivery tube 19' having a feed point 31 which may be adjusted to a preselected depth below the surface of the liquid in the dosage measuring receptacle by swinging it about a pivotal, liquid-tight connection indicated at 33.

OPERATION OF THE INVENTION

To measure out a dosage of medication (or other liquid) using the apparatus according to the invention, the slide (in the embodiment of FIGS. 1 and 2) or the swinging delivery tube (FIG. 3) are first adjusted to deliver the desired quantity of liquid, using appropriate calibrations (not shown in the drawings) which may be embossed on projections 25, or on the exterior of housing 11. Then, with the base 16 of the housing secured to the top of the container, vent 27 is momentarily opened to equalize the pressure inside the apparatus with that of the ambient atmosphere, and the whole assembly is then inverted, and subsequently restored to its original position, leaving the dosage measuring receptacle filled with the liquid being dispensed.

When the assembly is restored to its original upright position, the liquid being dispensed will immediately flow from the dosage measuring receptacle through delivery tube 19 or 19'. If it be desired to delay such flow, however, such delay can be easily achieved, for example by the use of a pinchcock on delivery means 35, or by making the latter flexible and sufficiently long so that it can be held with its mouth above the level of liquid in the dosage measuring receptacle until delivery is desired.

It will be noted that in the form of apparatus illustrated in FIGS. 1 and 2, the effective volume of the dosage measuring receptacle is determined by the position of slide 23, whereas in the embodiment shown in FIG. 3, it is determined by the vertical distance between the surface of the liquid in receptacle 15 and the intake end 31 of delivery tube 19'. Also to be noted is the configuration of delivery tube 19', having an inverted U-bend, which creates a mild siphoning action and thereby helps to avoid dripping from the delivery means 35.

While this invention has been described in terms of certain preferred embodiments and illustrated by way of certain drawings, these are illustrative only, as many alternatives and equivalents will readily suggest themselves to those skilled in the art, without departing from the spirit and proper scope of the invention.

For example, the internal end of the delivery tube 19' (FIG. 3) may be fitted with a threaded nipple or otherwise fitted with an extension piece or pieces to vary the effective height of the inlet end of the tube, and thereby vary the dosage, or the delivery tube 19' may be made of semi-rigid, deformable material, and bent as desired to achieve the same result. Also, the discharge end of the delivery tube may be fitted with a conventional rubber or plastic nipple, to facilitate administration of medication to infants or invalids who are unable to control the ingestion of liquids from a spoon or glass. By the same token, although the invention has been described in terms of a replaceable measuring top to be screwed onto the mouths of a number of containers successively, the dosage measuring receptacle may be made integral with the closed container, e.g. in the form of an internal receptacle one wall of which is an internal wall of the container, such as a paint can or the like, and such a construction is to be understood as comprehended within the scope of the language, "adapted to be connected in communication with a closed container . . . " etc.

Figure 5:
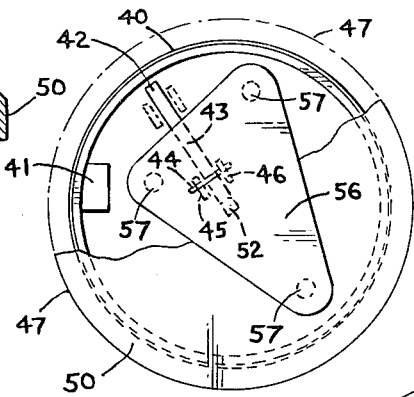
FIG. 5 is a top view in partial section of the magnetically activated lock shown in FIG. 4.

FIG. 4 shows a housing that has a container 40 with a barrier 41 which protrudes inwardly into the interior of the container 40. The barrier 41 protrudes moreover a sufficient distance into the interior of the container 40 to engage the end 42 (FIG. 5) of a magnetically susceptible bar 43. As shown in FIGS. 4 and 5, the bar 43 is pivoted in the vertical plane about an axle or axis 44. The axis 44 is mounted in a pair of spaced trunnions 45, 46 that protrude inwardly into the container from the undersurface of a closure 47 for the container 40. The closure 47 has an internally threaded annular flange 50 that protrudes over the top of the container 40 and engages threads 51 that are formed on the outer surface of the container 40 immediately adjacent to the open end of the container. Further in this respect it should be noted that the barrier 41 which protrudes into the interior of the container 40 is spaced below the open top of the container 40 by a sufficient distance to enable the bar 43 to pass between the open top of the container 40 and the uppermost edge of the barrier 41. Ordinarily however, a spring or small retaining magnet 52 which is fixed to the under surface of the closure 47 causes the magnetically susceptible bar 43 to pivot upwardly in the direction of arrow 53 thereby causing the end 42 of the bar 43 to pivot downwardly in the direction of arrow 54 to cause the end 42 of the bar 43 to engage the barrier 41 when an effort is made to unthread the closure 47 from the top of the container 40. This is the normal status of the container 40 and enclosure 47.

In order to cause the bar 43 to pivot in the opposite direction, thereby enabling the end 42 of the bar 43 to pass through a clearance 55 between the barrier 41 and the surface of the closure 47, a magnet holder 56 (FIG. 5) is placed over the top of the closure 47 and seated in alignment guides 57 in order to properly orient an activating magnet 60 (FIG. 4) that is fixed within the magnet holder 56. The magnetic field strength of the activating magnet 60 is sufficient to overcome the holding force of the retaining magnet 52 and to compel the magnet end 42 of the bar 43 to pivot upwardly against the inner surface of closure 47 thereby enabling the end 42 of the bar 43 to pass through the clearance 55 and avoid engagement with the barrier 41 when the closure 47 is being unthreaded from the container 40.

In this way only a person having access to a magnet holder 56 will be able to remove the closure 47 from the container 40.

To replace the closure 47 on the container 40, the magnet holder 56 is kept in place in order to insure that the end 42 of the bar 43 does not engage the barrier 41 as the cap 47 is screwed onto the container 40. Naturally, after the closure 47 has been secured to the end of the container 40, the activating magnet holder 56 is removed from the alignment guides 57 and either stored in a place that is safe from access to children or on the person of a container user.

Figure 6:
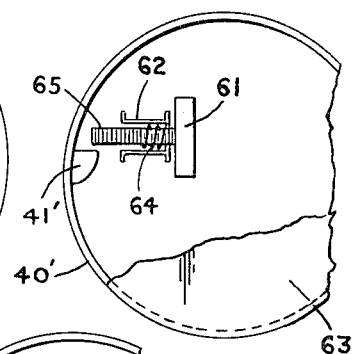
FIG. 6 is a plan view in section of another embodiment of the invention using principles of magnetic activation.

FIG. 6 shows a somewhat difference embodiment of the principle of magnetic application to container locking mechanisms. Thus, a magnetically susceptible bar 61 of steel or the like as shown in a plane that is transverse to the longitudinal axis of the container 40' is formed in the shape of the letter "T." The bar 61 is received for horizontal sliding motion of the shank of the "T" in a guide 62 that is formed on the underside of the closure 63. A coil spring 64 is located within the guide 62, and in the relaxed condition shown in FIG. 6, enables an end 65 of the bar 61 to bear against a barrier 41' on the inner wall of the container 40'. Thus the end 65 of the bar 61 when bearing against the barrier 41' prevents the closure 63 from being unthreaded and removed from the container 40'.

Figure 7:
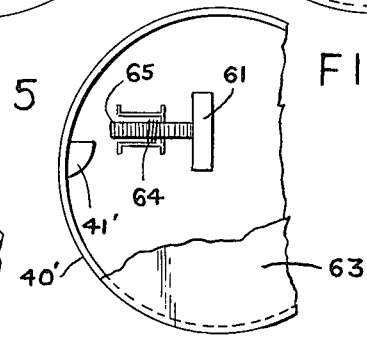
FIG. 7 is a plan view of the device shown in FIG. 6 in another condition of operation.

In order to remove the closure 63 from the container 40', attention is invited to FIG. 7 which shows the bar 61 withdrawn against the force of the coil spring 64 by means of a magnet (not shown in FIGS. 6 and 7) that applies sufficient force to compel the bar 61 to draw the end 65 out of engagement with the barrier 41', thereby enabling the closure 63 to be unthreaded from the container 40' because interference between the barrier 41' and the end 65 of the bar 61 has been temporarily removed. This magnetic withdrawal of the bar 61 is retained as the closure 63 is threaded back onto the container 40'. The magnet holder (not shown in FIG. 6) is withdrawn from the closure 63 to enable the coil spring 64 to press the bar 61 back into engagement with the barrier 41' as shown in FIG. 6.

Figure 8:
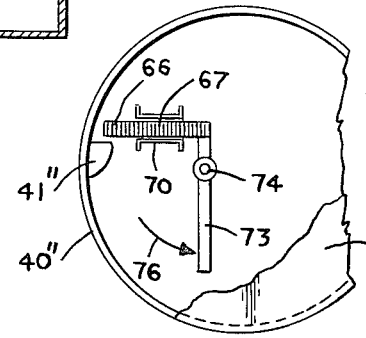
FIG. 8 is a plan view of a portion of a closure that is magnetically locked through motion of the locking member in a different plane from that which is shown in FIGS. 4 and 5.
Figure 9:
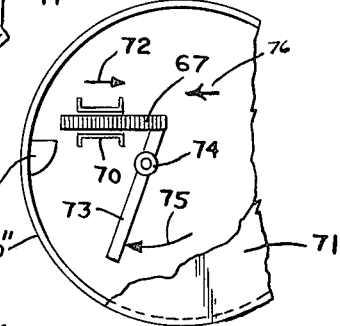
FIG. 9 shows the device illustrated in FIG. 8 in an open condition.

A further development of the invention is shown in FIGS. 8 and 9. Thus in FIG. 8, a barrier 41' is in engagement with an end 66 of a transversely slidable bar 67. The bar 67 is received for sliding movement in a guide or bearing 70 which are fixed to the surface of a closure 71 that forms a part of the inner surface of the container 40' when the closure is on the container. As shown in FIG. 9, the bar 67 is shifted in the direction of arrow 72 in response to the magnetically activated pivotal movement of a lever 73 which has a pivot 74 secured to the closure 71 and which engages the innermost end of the bar 67. Thus, in response to the application of a magnetic field, preferably by means of a magnet holder (not shown in FIGS. 8 and 9) that is applied to the opposite side of the closure 71 from that which is shown in the drawing, the magnetically susceptible lever 73 is shifted clockwise in the direction of arrow 75 to draw the bar 67 out of engagement with the barrier 41". This then enables the closure 71 to be unthreaded from the container 40" because the bar 67 no longer engages and is obstructed by the barrier 41'. To thread the closure 71 back on to the top of the container 40" the magnetically activatable lever 73 is continued in the condition shown in FIG. 9 in order to permit the bar 67 to clear the barrier 41. Once the closure 71 is threaded on the container 40", the magnet holder (not shown in FIGS. 8 and 9) is withdrawn from the closure 71 and a suitable spring, magnet or other means also not shown in FIGS. 8 and 9) enables the lever to snap back in the direction of arrow 76 thereby pressing the end 66 of the bar 67 back into engagement with the barrier 41".

The embodiments of the invention shown in FIGS. 5 through 9 inclusive, because of the particular features of construction, prevent the respective closures from being freely removed when the containers are inverted because, as shown in FIG. 4, the retaining magnet 52 keeps the bar 43 in blocking position without regard to the relative orientation of the closure 47, or the container 40, with respect to the horizontal. Similarly, the coil spring 64 in the embodiment of the invention shown in FIG. 6 keeps the end 65 of the bar 61 in an obstructing relationship with respect to the barrier 41' without regard to the relative position of the closure and the container 40' relative to the horizon.

Figures 10, 11:
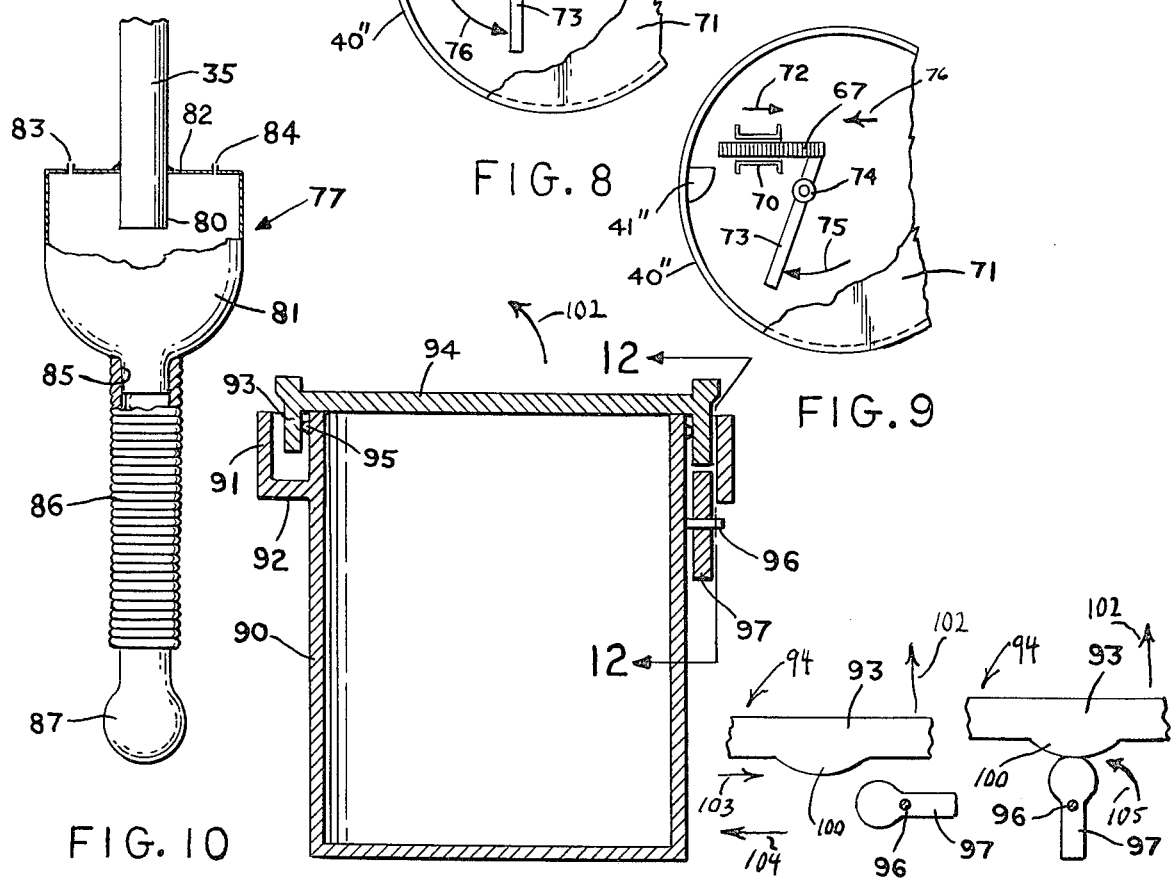
FIG. 10 is an adapter that prevents the extraction of liquids from containers in accordance with the principles of the invention.
FIG. 11 is a front elevation of still another embodiment of the invention.

A further safety feature that characterizes this invention is the adapter 77 that is shown in FIG. 10.

As illustrated, the delivery means 35 for a liquid filled container (not shown in FIG. 10 but illustrated in FIGS. 1 through 3, inclusive) has secured to its discharge nozzle 80 a funnel-like receiving cup 81. The receiving cup 81 is secured to the discharge nozzle 80 by means of a solid membrane 82 of plastic or the like that is fused or otherwise secured to the adjacent outer surface of the discharge means 35.

In accordance with a feature of the invention, air admission slots 83, 84 are formed in the membrane 82. The receiving cup 81 also has a discharge spout 85 that is in general alignment with the discharge nozzle 80 on the delivery means 35. Preferably, a flexible hose 86 provides a means for directing flow from the discharge spout 85 into a desired receptacle, which, for the purpose of illustration is shown in FIG. 10 as a conventional infant's nipple 87.

In operation, fluid flows through the delivery means 35 to the receiving cup 81 and from the receiving cup to the nipple 87 by way of the flexible hose 86. If further suction is applied to the receiving cup 81 by way of the nipple 87, more liquid cannot be drawn out of the container (not shown in FIG. 10 but shown in FIGS. 1 through 3 inclusive). Typically, the siphon function that characterizes discharge from the container 11 (FIG. 1) is disrupted because the air admission slots 83, 84 prevent a vacuum from being applied beyond the receiving cup 81 and directly to the interior of the container 11 (FIG. 1).

Turning once more to FIG. 1, a further embodiment of the invention would place the vent 27 in a recessed position relative to the housing 11. Thus, with the vent 27 formed in the interior of the housing 11, a tool, cam, key or other suitable device is necessary to open the vent 27 and enable air under atmospheric pressure to enter the housing 11 in order to permit liquid within the housing 11 to flow from the housing and through the delivery means as hereinbefore described.

An additional embodiment of the invention is shown in FIGS. 11 throug 13 inclusive. As illustrated in FIG. 11, a housing includes a container 90 that has an annular circumferential flange 91 which is generally parallel with and spaced from the outer surface of the container 90 by means of a transversely disposed annular ring 92. The ring 92 spaces the flange 91 from the outer surface of the container 90 a sufficient distance to enable a protruding cylindrical lip 93 to be interposed between the inner surface of the flange 91 and the adjacent outer surface of the container 90. Thus, subject to an exception subsequently to be described, the lip 93 of closure 94 is effectively concealed by means of the flange 91. A detent 95, of a type commonly used with snap-on type closures engages the inner surface of the lip 93 in order to retain the closure 94 in position across the otherwise open end of the container 90.

Figures 12, 13:
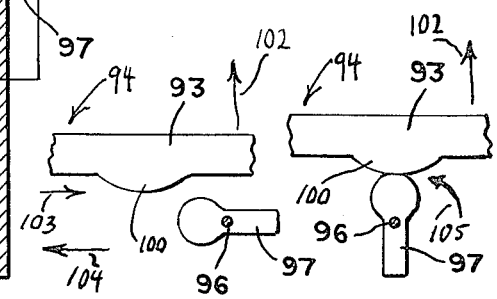
FIG. 12 is a detail view of a portion of the container that is shown in FIG. 11 taken along the lines 12—12, and viewed in the direction of the arrows.
FIG. 13 is a similar detailed view of the container shown in FIG. 11 in which however, the closure and lever have been aligned.

The surface of the container 90 also accommodates a fulcrum 96 that protrudes outwardly from the container 90 in longitudinal alignment with a gap in the ring 92. In order to accommodate a cam follower or lifting lever 97 as shown in FIG. 11, a gap in the ring 92 enables the lifting lever 97 to protrude inwardly between the flange 91 and the adjacent outer surface of the container 90. Depending on the orientation of the closure 94 with respect to the lifting lever 97, as well as the orientation of the lifting lever 97 with respect to the container 90 as shown in FIG. 12, a clearance is provided between the lowermost protrusion of the lip 93 and the lifting lever 97. A cam or contact portion 100 on the lip 93 extends below the general transverse level of that portion of the closure 94 a sufficient longitudinal distance to permit the lifting lever 97 to bear against the contact portion 100 and wedge it away from the top of the container 90 (FIG. 11) in the direction of arrow 102. To pry the closure 94 from the container 90, the contact portion 100 must be in vertical alignment with the lifting lever 97, as shown in FIG. 13. To establish this needed alignment, the closure 94 is turned in the direction of arrows 103, 104 (FIG. 12) through an appropriate number of degrees.

In operation, the closure 94 is twisted to establish vertical alignment between the lifting lever 97 and the contact portion 100 of the closure 94 as shown in FIG. 13. The lifting lever 97 is pivoted in the direction of arrow 105 in order to press the closure 94 away from the container 90 (FIG. 11) in the direction of the arrow 102.

To replace the closure 94, the lifting lever 97 is pivoted away from the contact portion 100, as shown in FIG. 12. The closure 94 is pressed onto the container 90 until it is fully seated, as shown in FIG. 11. The closure 97 then is twisted in the direction of the arrow 103, or the arrow 104, in order to prevent an inadvertent alignment between the contact portion 100 of the closure and the lifting lever 97. In this manner, attempts by children to open the container 90 are essentially frustrated, while the elderly or infirm are not impeded in obtaining access to the container contents.

Thus, there is provided in accordance with the invention techniques that permit the sanitary administration of precisely administered dosages of medicines, quantities of chemical reagents, and the like, while nevertheless balancing the need to provide easy accessibility to the container contents for infirm, elderly, or weak adults with the somewhat contrary requirement that access to the contents should be made extremely difficult, if not impossible for children.

I claim:

1. A volumetric dispenser for dispensing measured increments of a liquid from a supply of the same, comprising in combination:

a housing having a closed top and adapted to be connected in communicating relation with a closed container containing a supply of liquid, a dosage measuring receptacle disposed internally of said housing, said dosage measuring receptacle having a closed bottom and an open top, and being fillable by inversion of said container and said housing followed by restoration thereof to their initial relative positions, means defining a passage extending from a point inside said dosage measuring receptacle to a delivery point outside said container, means completely disposed internally of said housing for adjusting the effective volume of said dosage measuring receptacle to a selected value, and means independent of said dosage measuring receptacle and said means for adjusting the effective volume thereof and external of said housing, for relieving inequalities between the pressure of the ambient atmosphere and the pressure in the vapor space over the liquid in said container and in said dosage measuring receptacle, said means for adjusting the effective volume of said dosage measuring receptacle comprising a delivery tube disposed internally of said housing, said tube having a feed point selectively adjustable to a predetermined depth within said dosage measuring receptacle located below the surface of the liquid container therein, said tube establishing communication for the liquid with said passage defining means to the delivery point outside said container, and a pivotal liquid-tight connector joining said tube with said passage defining means.

* * * * *